(12) United States Patent
Nam

(10) Patent No.: US 12,435,853 B1
(45) Date of Patent: Oct. 7, 2025

(54) OPTICAL DEVICE AND VEHICLE INCLUDING THE SAME

(71) Applicant: HYUNDAI MOBIS CO., LTD., Seoul (KR)

(72) Inventor: Gyung Mok Nam, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/908,139

(22) Filed: Oct. 7, 2024

(30) Foreign Application Priority Data

Jul. 11, 2024 (KR) .......................... 10-2024-0091826

(51) Int. Cl.
| | |
|---|---|
| *F21S 41/663* | (2018.01) |
| *F21S 41/153* | (2018.01) |
| *F21S 41/24* | (2018.01) |
| *F21S 41/265* | (2018.01) |
| *F21S 41/275* | (2018.01) |
| *F21W 102/13* | (2018.01) |
| *F21Y 105/16* | (2016.01) |
| *F21Y 115/10* | (2016.01) |

(52) U.S. Cl.
CPC ........... *F21S 41/663* (2018.01); *F21S 41/153* (2018.01); *F21S 41/24* (2018.01); *F21S 41/265* (2018.01); *F21S 41/275* (2018.01); *F21W 2102/13* (2018.01); *F21Y 2105/16* (2016.08); *F21Y 2115/10* (2016.08)

(58) Field of Classification Search
CPC ........ F21S 41/663; F21S 41/24; F21S 41/275; F21S 41/265; F21S 41/153
See application file for complete search history.

(56) References Cited

U.S. PATENT DOCUMENTS

| | | | | |
|---|---|---|---|---|
| 4,921,329 | A * | 5/1990 | Ito ........................ | G03B 21/625 |
| | | | | 359/456 |
| 10,480,742 | B2 * | 11/2019 | Joerg ...................... | F21S 45/47 |
| 2008/0080201 | A1 * | 4/2008 | Specht .................. | F21S 41/143 |
| | | | | 362/507 |
| 2016/0169468 | A1 * | 6/2016 | Björn .................... | F21S 41/141 |
| | | | | 362/509 |
| 2018/0245759 | A1 * | 8/2018 | Plank .................... | F21S 41/663 |
| 2020/0158310 | A1 * | 5/2020 | Brick ..................... | F21V 15/01 |
| 2020/0217471 | A1 * | 7/2020 | Moser .................... | F21S 41/43 |
| 2021/0381670 | A1 * | 12/2021 | Lee ........................ | F21S 41/25 |

* cited by examiner

*Primary Examiner* — Christopher E Dunay
(74) *Attorney, Agent, or Firm* — NSIP Law

(57) ABSTRACT

An optical device including a light source array configured to output light, a light guide member configured to allow the light output from the light source array to be irradiated forward, a condenser lens positioned in front of the light guide member and configured to refract the light irradiated through the light guide member, and an exit lens positioned in front of the condenser lens and configured to form a beam pattern using the light refracted from the condenser lens, the condenser lens including an exit surface formed to include a first curvature at a center and a second curvature at an edge, the first curvature being different from the second curvature.

15 Claims, 12 Drawing Sheets

OPTICAL DEVICE AND VEHICLE INCLUDING THE SAME

CROSS-REFERENCE TO RELATED APPLICATIONS

This application claims the benefit under 35 USC § 119(a) of Korean Patent Application No. 10-2024-0091826, filed on Jul. 11, 2024, the entire disclosure of which is incorporated herein by reference for all purposes.

BACKGROUND

1. Field

The disclosure relates to an optical device which may increase the number of paths of light passing through an exit lens forming a beam pattern by refracting light from an exit surface of a condenser lens, and a vehicle including the same.

2. Description of the Related Art

In general, a vehicle is equipped with various lamps that emit light forward depending on an ambient environment and time of day to secure a driver's vision and inform other vehicles of its traveling path.

These lamps are categorized according to the purposes of use, such as a turn signal for securing the driver's vision and indicating the position of the vehicle, together with a headlamp for illuminating ahead of the vehicle, a fog lamp for securing the driver's vision and indicating the position of the vehicle in a foggy or rainy condition, together with the headlamp, a reverse light for lighting up when the vehicle is in reverse, and a brake light for lighting up when the driver applies the brakes.

Halogen bulbs are mainly used for conventional vehicle lamps. When a halogen lamp is used as a light source, there is a reflector that reflects light irradiated by the halogen lamp, and the reflected light is irradiated forward. However, while halogen lamps have the advantage of being inexpensive, they have the disadvantages of high heat generation during use, low brightness relative to the amount of electricity used, and short lifespans.

To solve these problems, vehicle lamps using light emitting diodes (LEDs) have emerged. LED lamps have the advantages of high brightness, long lifespans, and low power consumption.

Among the vehicle lamps, headlamps form low beam or high beam patterns to ensure the driver's forward vision when driving in dark surroundings such as at night, and play a very important role in driving.

A vehicle is equipped with a function of simultaneously or separately irradiating low beams to a short distance and high beams to a long distance in front of the vehicle.

From the driver's perspective, irradiating low beams and high beams simultaneously is the safest way to drive because it ensures the driver's vision for both the short and long distances in front of the vehicle.

However, high beams carry the risk of causing glare to the driver of an oncoming vehicle or an oncoming pedestrian, making it impossible to secure vision during a time required for light and dark adaptation.

In this regard, the driver continuously checks for oncoming vehicles or pedestrians and repeatedly turns high beams on and off, which also harms the safety of driving and causes considerable inconvenience to the driver.

To supplement this, driver assistance systems which automatically turn on and off high beams depending on the presence of an opposing vehicle or a preceding vehicle, or control the irradiation angle or brightness of low beams and high beams depending on road conditions (city, highway, intersection, and so on) have been developed and commercialized.

Recently, adaptive drive beam (ADB) technology has been developed to detect an opposing vehicle, a preceding vehicle, a pedestrian, and so on from a video image in front of the vehicle, and change a lamp irradiation angle or turn off the light source so that high beams are not irradiated to the location of a detected vehicle or pedestrian.

To improve the driver's visibility through a more differentiated beam pattern, the number of paths of light passing through a lens which forms a beam pattern needs to be increased, and thus a means for improving light collection efficiency is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided an optical device including a light source array configured to output light, a light guide member configured to allow the light output from the light source array to be irradiated forward, a condenser lens positioned in front of the light guide member and configured to refract the light irradiated through the light guide member, and an exit lens positioned in front of the condenser lens and configured to form a beam pattern using the light refracted from the condenser lens, the condenser lens including an exit surface formed to include a first curvature at a center and a second curvature at an edge, the first curvature being different from the second curvature.

The second curvature may be smaller than the first curvature.

The exit surface of the condenser lens may be formed to refract the light irradiated through the light guide member from the edge at a first angle larger than a second angle of the light irradiated through the light guide member from the center.

The exit surface of the condenser lens may be formed in a convex shape.

The light source array may include a first light source array arranged in a horizontal direction and a second light source array arranged vertically spaced apart from the first light source array and the light guide member may include a first light-incident portion formed to correspond to the first light source array and a second light-incident portion formed to correspond to the second light source array.

The exit surface of the condenser lens may include a first region configured to refract light irradiated through the first light-incident portion, a second region configured to refract light irradiated through the second light-incident portion, and an overlapping region in which the first region and the second region overlap each other.

The exit surface of the condenser lens may include a first pattern portion formed in the overlapping region.

The first pattern portion may include a pattern surface forming a predetermined angle with the exit surface.

The pattern surface may be configured to transmit one of the light irradiated through the first light-incident portion and the light irradiated through the second light-incident portion and the pattern surface may be further configured to totally reflect the other one of the light irradiated through the first light-incident portion and the light irradiated through the second light-incident portion.

The first pattern portion may include an array shape continuously formed in the horizontal direction.

The exit surface of the condenser lens may include a second pattern portion formed in one of the first region or the second region.

The second pattern portion may be formed in one of a relief shape to protrude from the exit surface or in a negative shape to be recessed from the exit surface.

A first length of the condenser lens may be a horizontal direction or a vertical direction may be larger than a second length of the light guide member in the horizontal direction or the vertical direction.

A third length of the exit lens in the horizontal direction or the vertical direction may be larger than the first length of the condenser lens in the horizontal direction or the vertical direction.

In a general aspect, here is provided a vehicle including a vehicle body, a lamp structure positioned on a front surface of the vehicle body, and an optical device embedded in the lamp structure, the optical device including a light source array configured to output light, a light guide member configured to allow the light output from the light source array to be irradiated forward, a condenser lens positioned in front of the light guide member and configured to refract the light irradiated through the light guide member, and an exit lens positioned in front of the condenser lens and configured to form a beam pattern using the light refracted from the condenser lens, and the condenser lens includes an exit surface formed to include a first curvature at a center and a second curvature at an edge, the first curvature being different from the second curvature.

Figure 1:
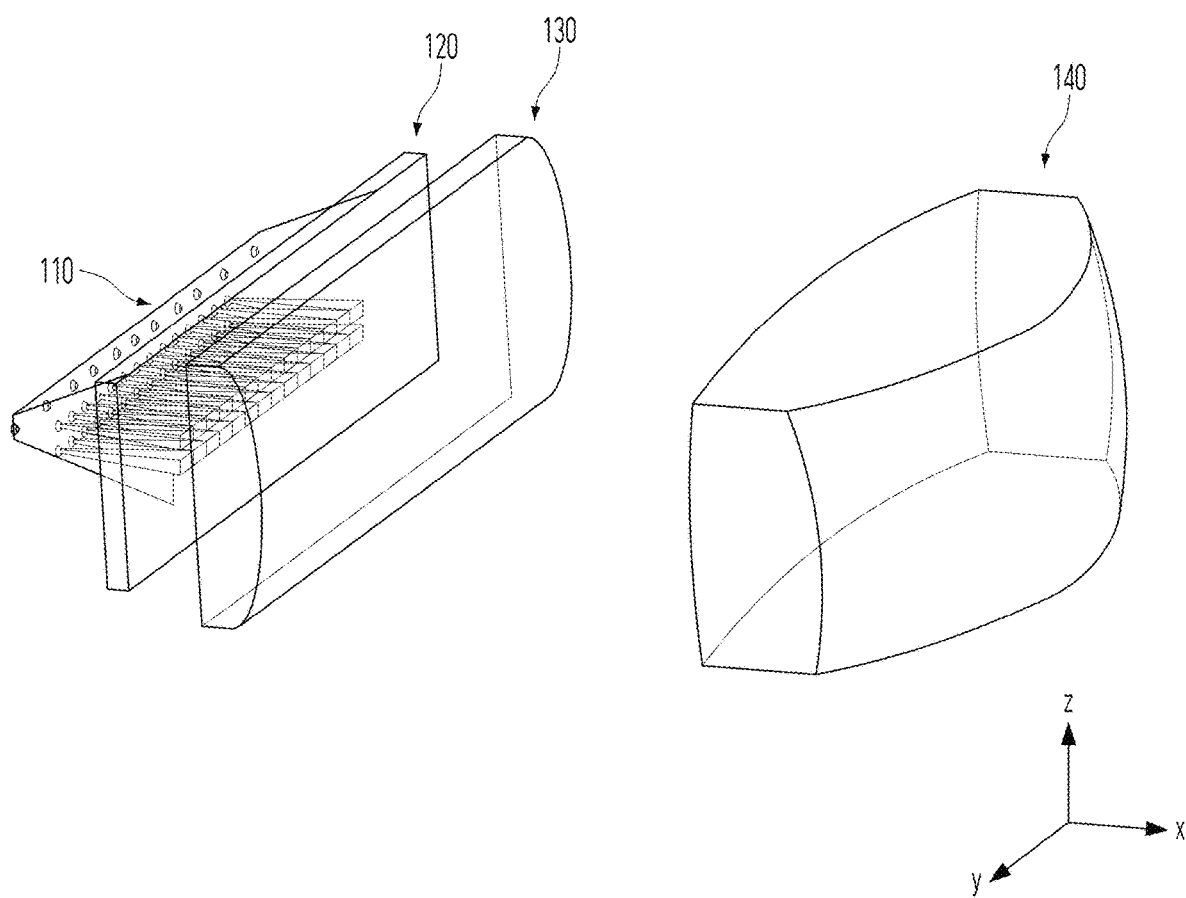
FIG. 1 is a perspective view illustrating an optical device according to an embodiment of the disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
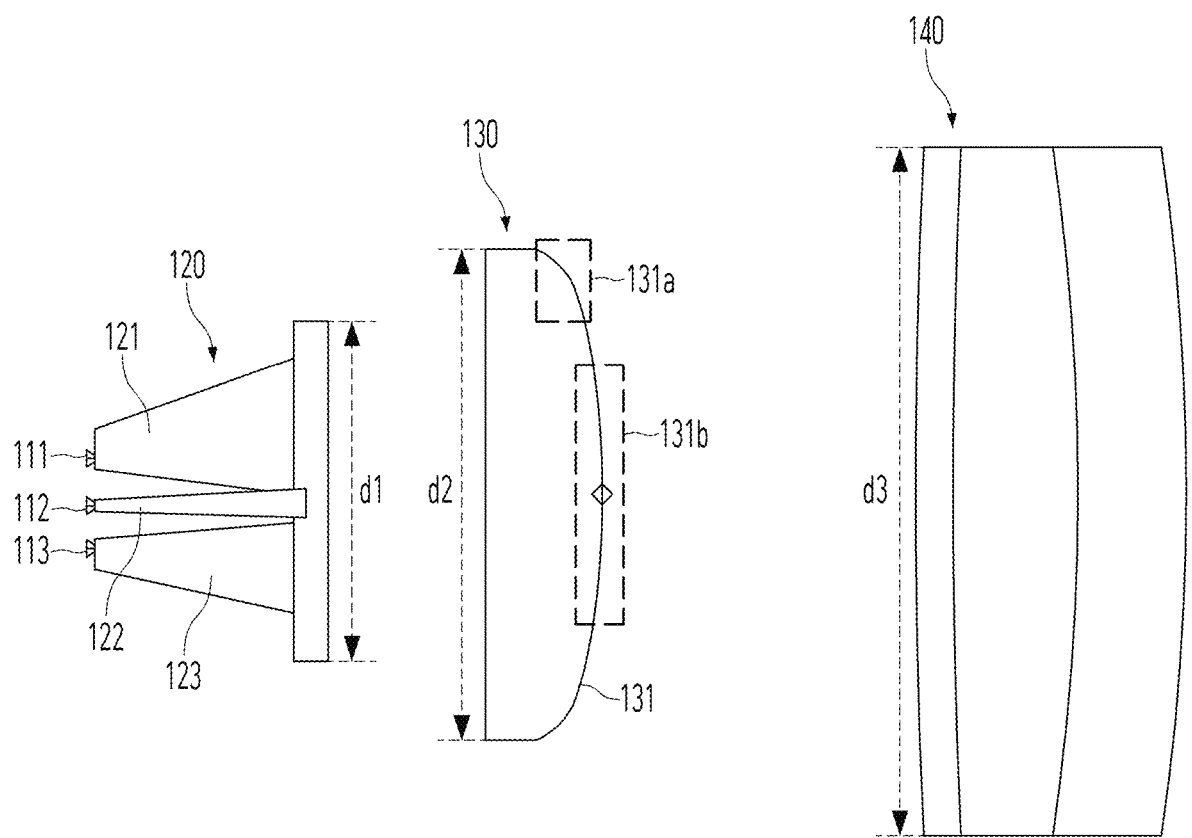
FIG. 2 is a side view illustrating an optical device according to an embodiment of the disclosure.
Figure 3:
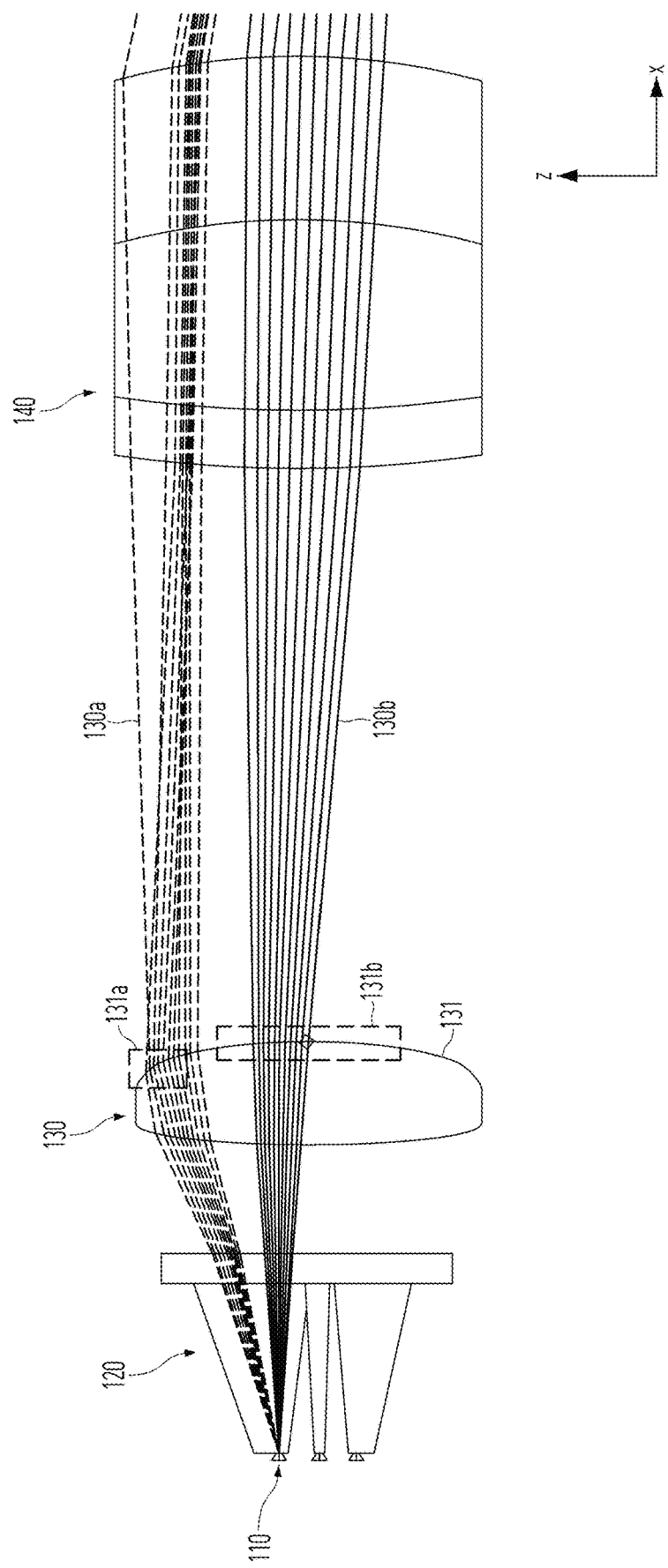
FIG. 3 is a diagram illustrating a path of light refracted from a condenser lens in an optical device according to an embodiment of the disclosure.

FIG. 1 is a perspective view illustrating an optical device 100 according to an embodiment of the disclosure. FIG. 2 is a side view illustrating the optical device 100 according to an embodiment of the disclosure. FIG. 3 is a diagram illustrating a path of light refracted from a condenser lens 130 in the optical device 100 according to an embodiment of the disclosure.

The optical device 100 according to an embodiment of the disclosure may be embedded in a lamp structure located on a front surface of a vehicle body, and may be provided in a vehicle through the lamp structure. Further, the optical device 100 according to the disclosure may include the afore-described adaptive drive beam (ADB).

In describing the optical device 100 according to an embodiment of the disclosure, forward and backward directions will be described based on an x-axis direction, a left-right direction will be described based on a y-axis direction, and an up-down direction will be described based on a z-axis direction.

The optical device 100 according to an embodiment of the disclosure may include a light source array 110, a light guide member 120, the condenser lens 130, and an exit lens 140. The light source array 110 may serve to output light. Further, the light guide member 120 may serve to irradiate the light output from the light source array 110 in the forward direction (x-axis direction).

The light source array 110 may be arranged in a horizontal direction (y-axis direction), as illustrated in FIG. 1. More specifically, referring to FIGS. 2 and 3 together, the light source array 110 in the optical device 100 according to an embodiment of the disclosure may include a first light source array 111 and a second light source array 112 arranged spaced apart from the first light source array 111 in a vertical direction (z-axis direction). Additionally, the light source array 110 may include a third light source array 113 arranged spaced apart from the second light source array 112 in the vertical direction (z-axis direction).

Further, the light guide member 120 may include a first light-incident portion 121 formed to correspond to the first light source array 111 and a second light-incident portion 122 formed to correspond to the second light source array 112 so that light output from the light source array 110 is irradiated in the forward direction (x-axis direction). Additionally, the light guide member 120 may include a third light-incident portion 123 formed to correspond to the third light source array 113.

In the optical device 100 according to an embodiment of the disclosure, the condenser lens 130 may be positioned in front of the light guide member 120 (in the x-axis direction). The condenser lens 130 may serve to refract light irradiated through the light guide member 120.

Further, in the optical device 100 according to an embodiment of the disclosure, the exit lens 140 may be positioned in front of the condenser lens 130 (in the x-axis direction) and serve to form a beam pattern using the light refracted from the condenser lens 130.

The beam pattern may include a low beam pattern in which light is irradiated to a short distance in front of the vehicle and a high beam pattern in which light is irradiated to a long distance in front of the vehicle, as described above. The optical device 100 according to an embodiment of the disclosure may irradiate the low beam pattern and the high beam pattern simultaneously or separately, which may be implemented through the afore-described light source arrays 111, 112, and 113 arranged spaced apart from one another in the vertical direction (z-axis direction).

Particularly, as illustrated in FIG. 2, in the optical device 100 according to an embodiment of the disclosure, the condenser lens 130 may include an exit surface 131 formed to have different curvatures at a center 131b and an edge 131a thereof.

The exit surface 131 of the condenser lens 130 may be formed to have the curvature of the edge 131a smaller than the curvature of the center 131b. That is, in the optical device 100 according to an embodiment of the disclosure, the condenser lens 130 may include an aspherical shape with different curvatures on the exit surface 131.

Accordingly, in the optical device 100 according to an embodiment of the disclosure, the exit surface 131 of the condenser lens 130 may be formed to refract light irradiated through the light guide member 120 from the edge 131a at a larger angle than the light irradiated through the light guide member 120 from the center 131b.

That is, as illustrated in FIG. 3, light 130a refracted from the edge 131a of the exit surface 131 may form a larger refracted angle than light 130b refracted from the center 131b of the exit surface 131. As described above, this may be implemented by forming the curvature of the edge 131a to be smaller than the curvature of the center 131b on the exit surface 131 of the condenser lens 130.

Therefore, the optical device 100 according to an embodiment of the disclosure may focus light to increase the number of paths of light passing through the exit lens 140 forming a beam pattern by making the curvatures of the center 131b and the edge 131a of the exit surface 131 of the condenser lens 130 different from each other.

Further, in the optical device 100 according to an embodiment of the disclosure, the exit surface 131 of the condenser lens 130 may include a convex shape, which may be a more advantageous shape for increasing the light collection efficiency described above.

Referring to FIGS. 2 and 3 together, in the optical device 100 according to an embodiment of the disclosure, the condenser lens 130 may be formed to be larger than the light guide member 120 in order to increase the light collection efficiency by increasing the number of paths of light passing through the afore-described exit lens 140.

That is, in the optical device 100 according to an embodiment of the disclosure, a length d2 of the condenser lens 130 in the horizontal direction (y-axis direction) or vertical direction (z-axis direction) may be formed to be larger than a length d1 of the light guide member 120 in the horizontal direction (y-axis direction) or vertical direction (z-axis direction).

Further, in the optical device 100 according to an embodiment of the disclosure, a length d3 of the exit lens 140 in the horizontal direction (y-axis direction) or vertical direction (z-axis direction) may be formed to be larger than the length d2 of the condenser lens 130 in the horizontal direction (y-axis direction) or vertical direction (z-axis direction). That is, the exit lens 140 may be formed to be larger than the condenser lens 130.

Therefore, the optical device 100 according to an embodiment of the disclosure may minimize deviation of light irradiated through the light guide member 120 from the condenser lens 130. In addition, it may minimize deviation of the light refracted from the condenser lens 130 from the exit lens 140. This may increase the afore-described light collection efficiency.

Figure 8:
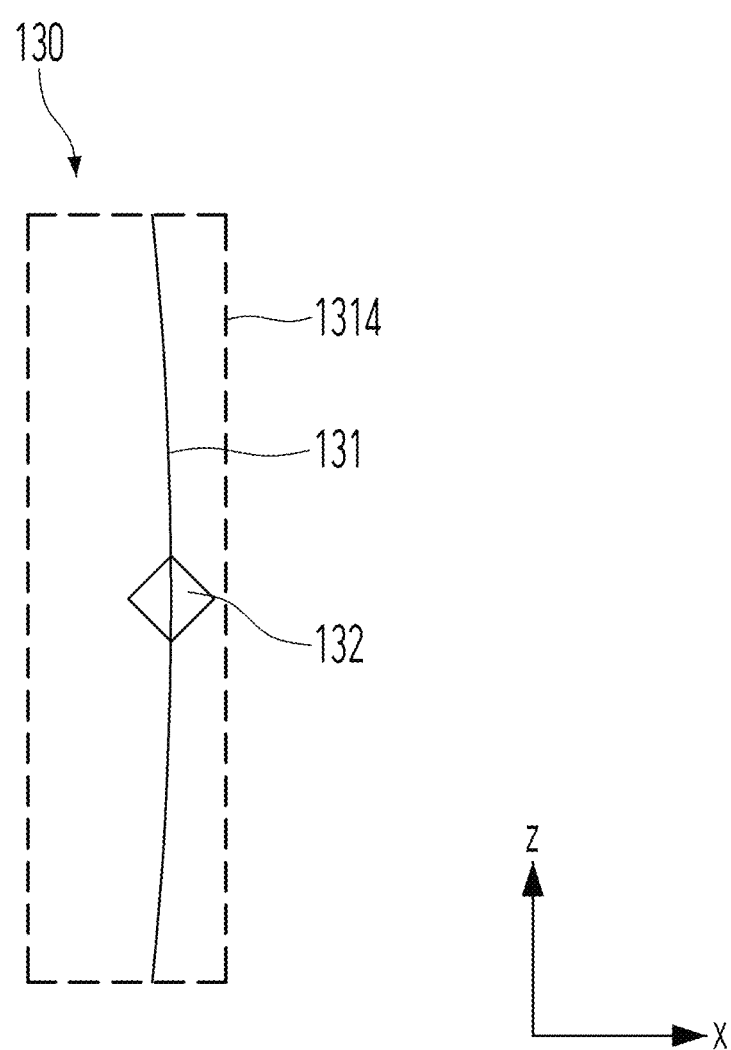
FIG. 8 is a diagram illustrating a first pattern portion formed in an overlapping region of an exit surface of a condenser lens in an optical device according to an embodiment of the disclosure.
Figure 9:
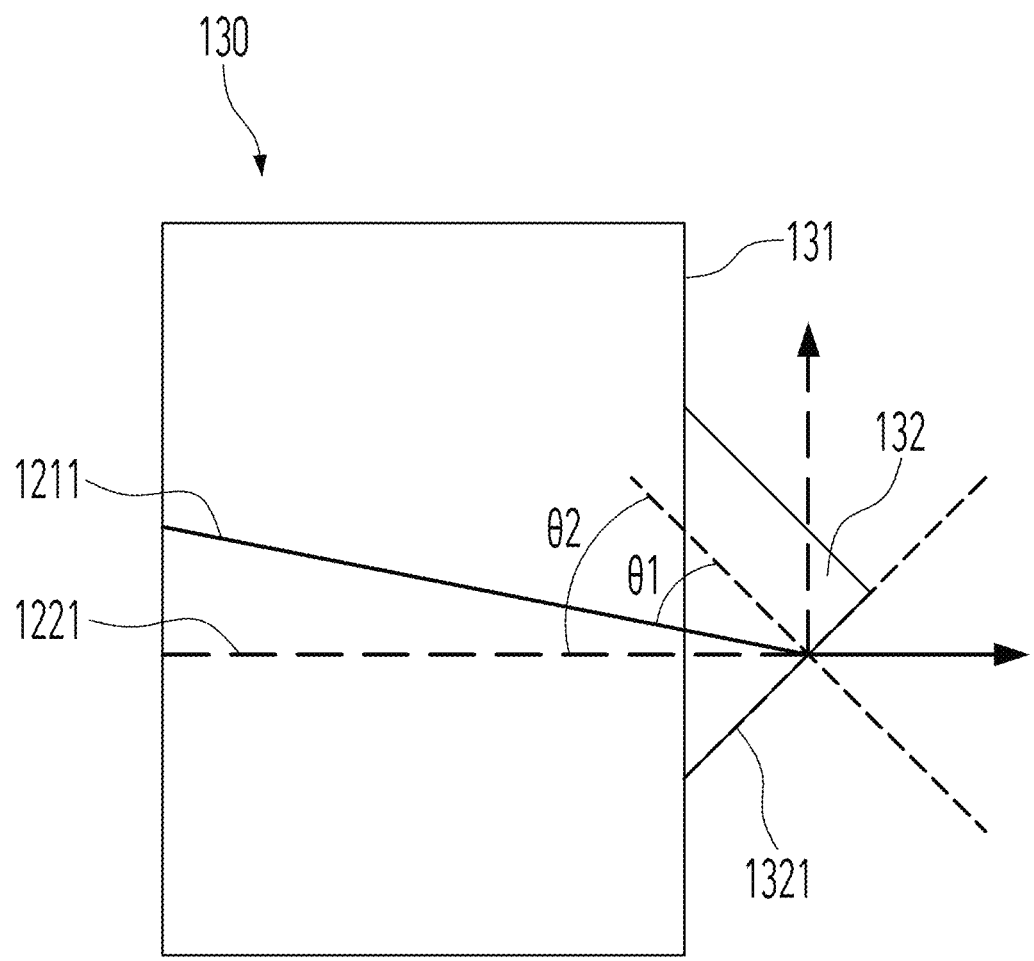
FIGS. 9 and 10 are diagrams illustrating characteristics of a pattern surface of a first pattern portion in an optical device according to an embodiment of the disclosure.
Figure 10:
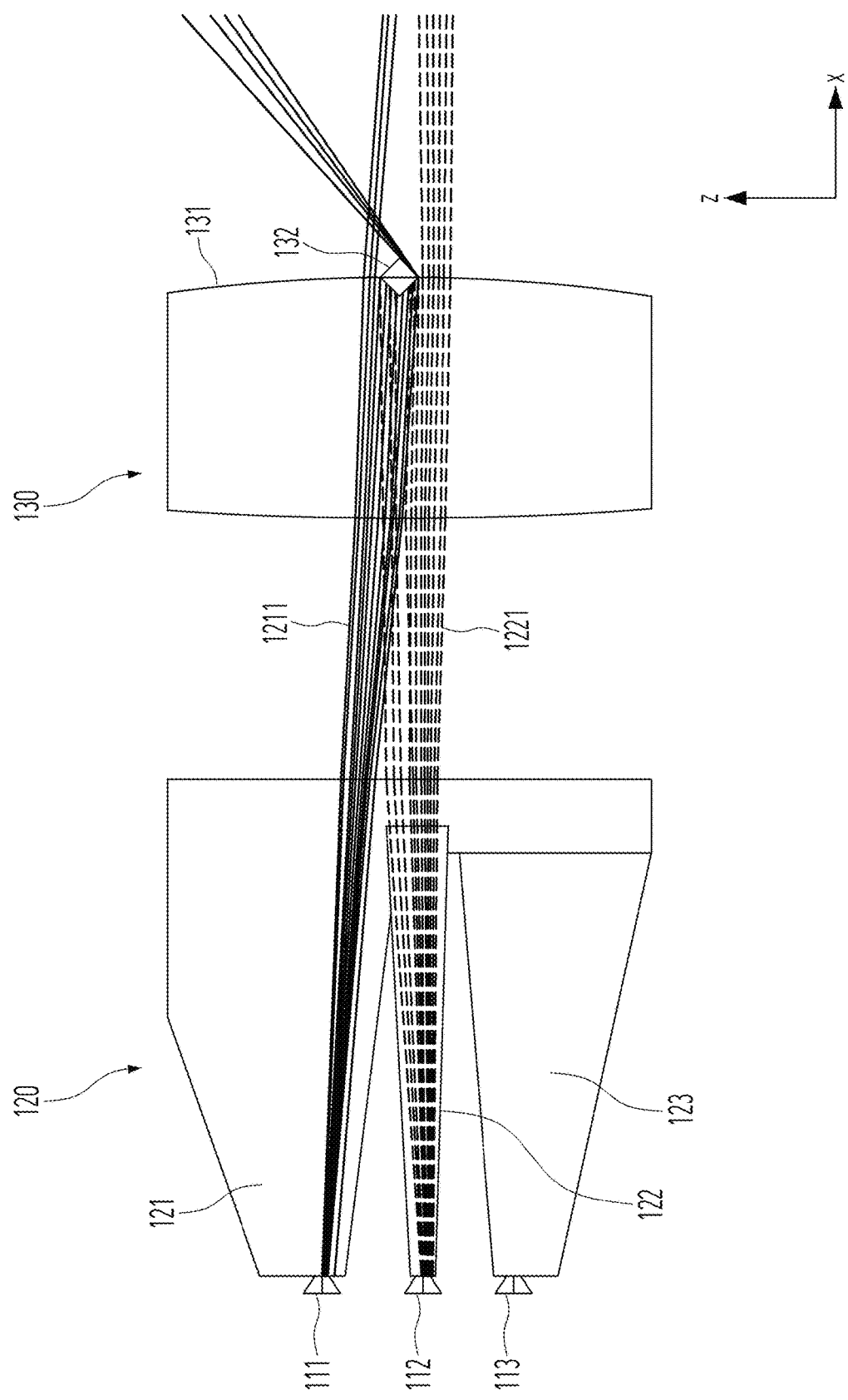
Figure 11:
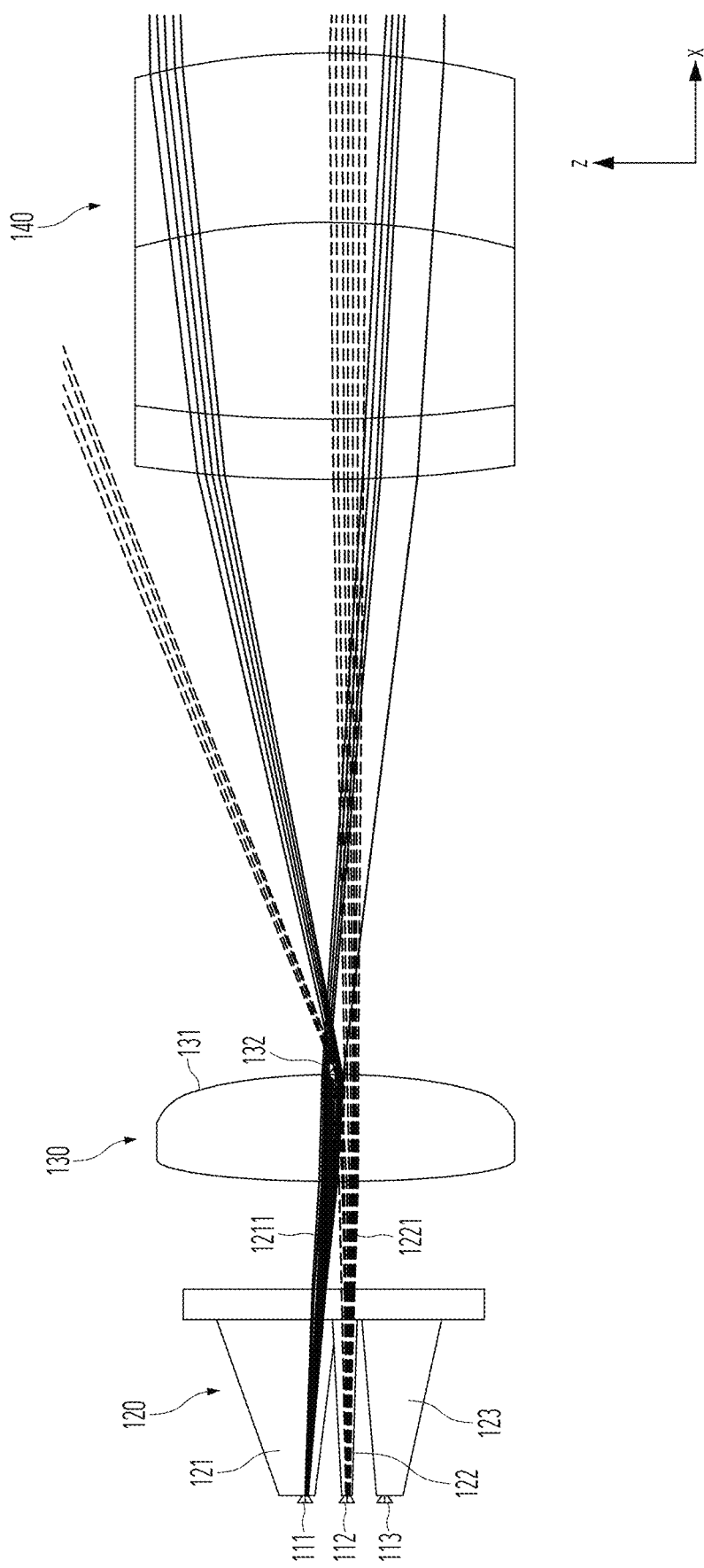
FIG. 11 is a diagram illustrating another embodiment of a path of light refracted from a condenser lens in an optical device according to an embodiment of the disclosure.
Figure 12:
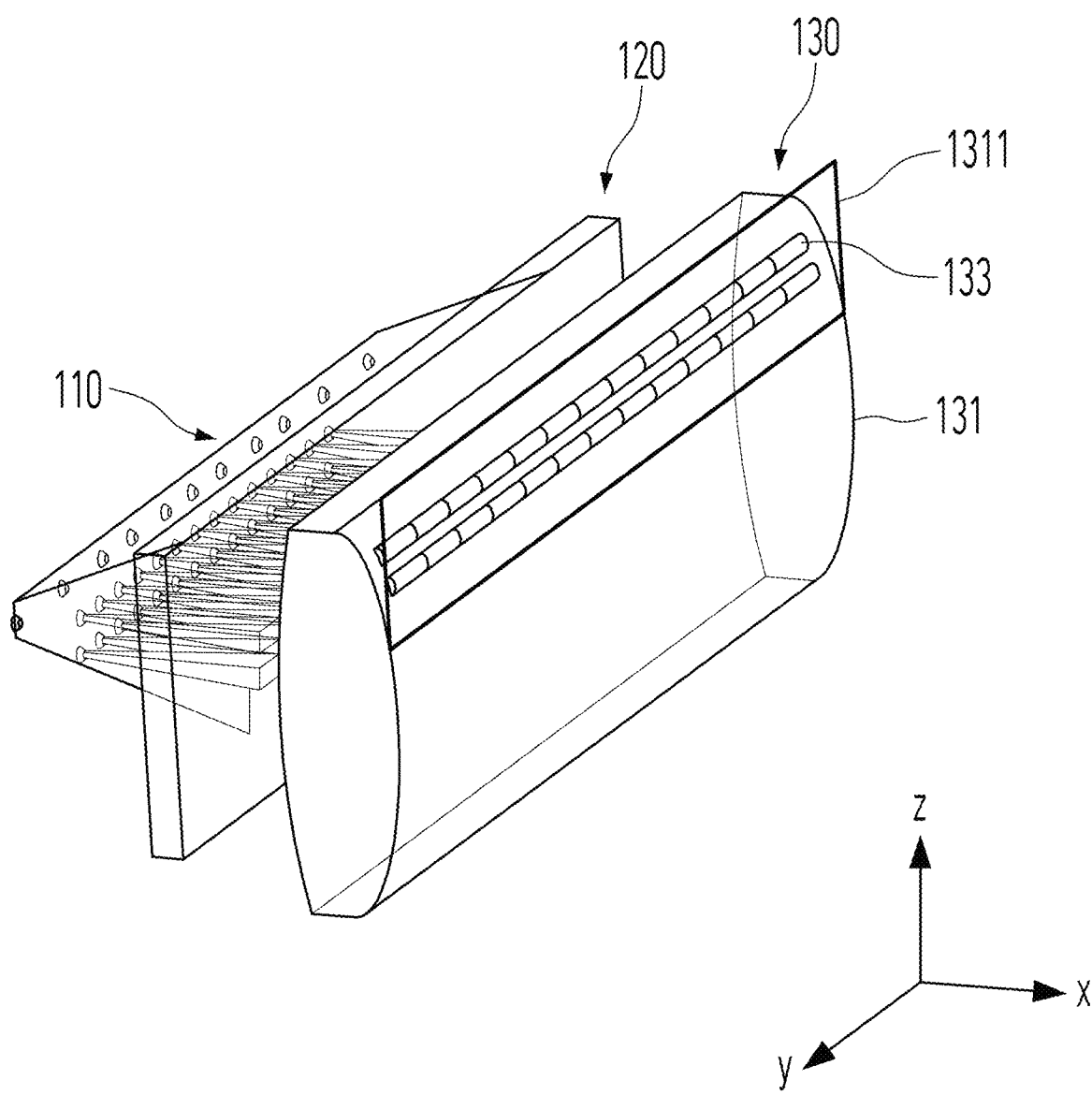
FIG. 12 is a diagram illustrating a second pattern portion formed in a first region of an exit surface of a condenser lens in an optical device according to an embodiment of the disclosure.

FIGS. 4 to 7 are diagrams illustrating characteristics of the exit surface 131 of the condenser lens 130 in the optical device 100 according to an embodiment of the disclosure. FIG. 8 is a diagram illustrating a first pattern portion 132 formed in an overlapping region on the exit surface 131 of the condenser lens 130 in the optical device 100 according to an embodiment of the disclosure. FIGS. 9 and 10 are diagrams illustrating characteristics of a pattern surface 1321 of the first pattern portion 132 in the optical device 100 according to an embodiment of the disclosure. FIG. 11 is a diagram illustrating another embodiment of paths of light refracted from the condenser lens 130 in the optical device 100 of the disclosure. FIG. 12 is a diagram illustrating a second pattern portion 133 formed in a first region 1311 of the exit surface 131 of the condenser lens 130 in the optical device 100 according to an embodiment of the disclosure.

As described above, in the optical device 100 according to an embodiment of the disclosure, the light source array 110 may include the first light source array 111 arranged in the horizontal direction (y-axis direction) and the second light source array 112 arranged spaced apart from the first light source array 111 in the vertical direction (z-axis direction). The light source array 110 may further include the third light source array 113 arranged spaced apart from the second light source array 112 in the vertical direction (z-axis direction).

Further, in the optical device 100 according to an embodiment of the disclosure, the light guide member 120 may include the first light-incident portion 121 formed to correspond to the first light source array 111 and the second light-incident portion 122 formed to correspond to the second light source array 112. The light guide member 120 may further include the third light-incident portion 123 formed to correspond to the third light source array 113.

Figure 4:
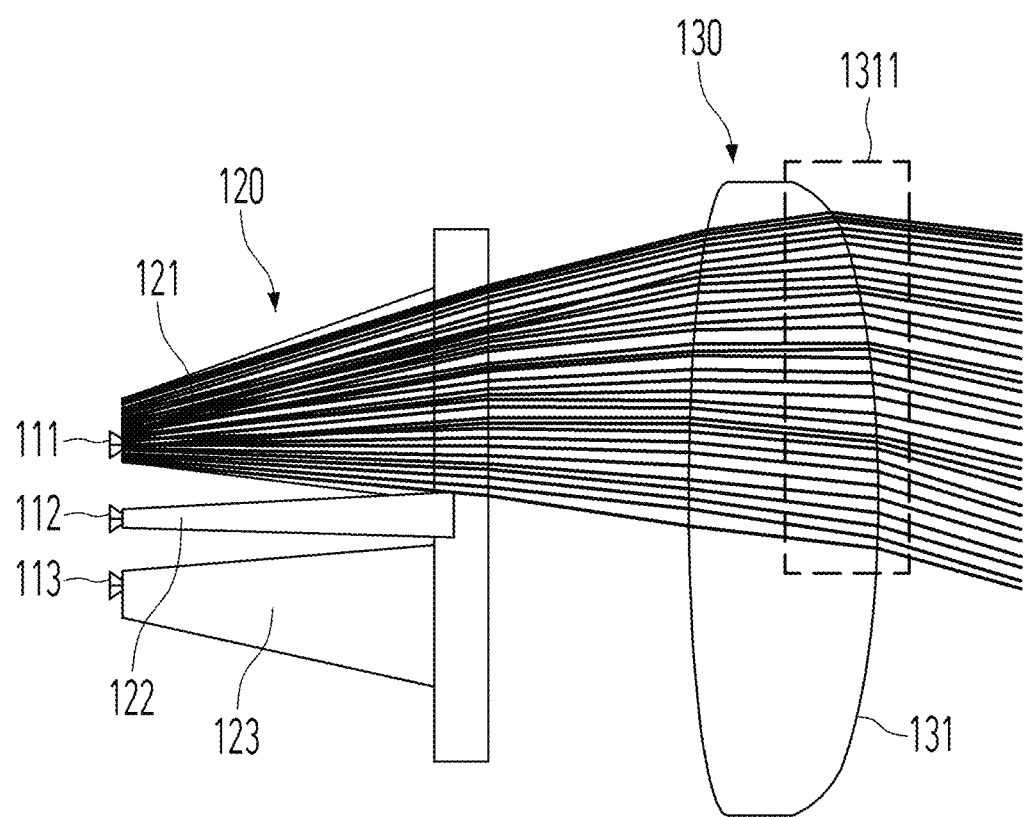
FIGS. 4 to 7 are diagrams illustrating characteristics of an exit surface of a condenser lens in an optical device according to an embodiment of the disclosure.
Figure 5:
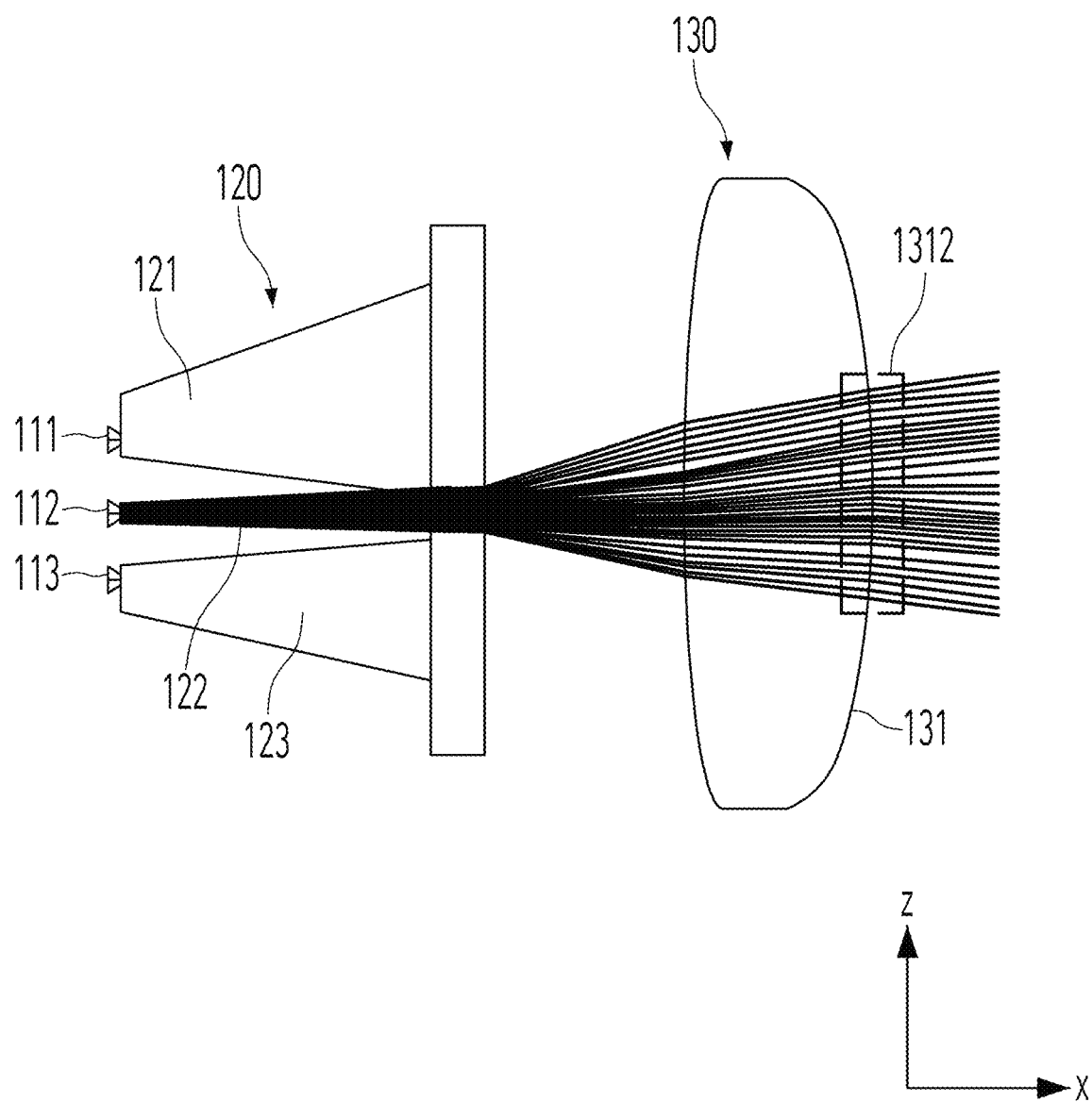
Figure 6:
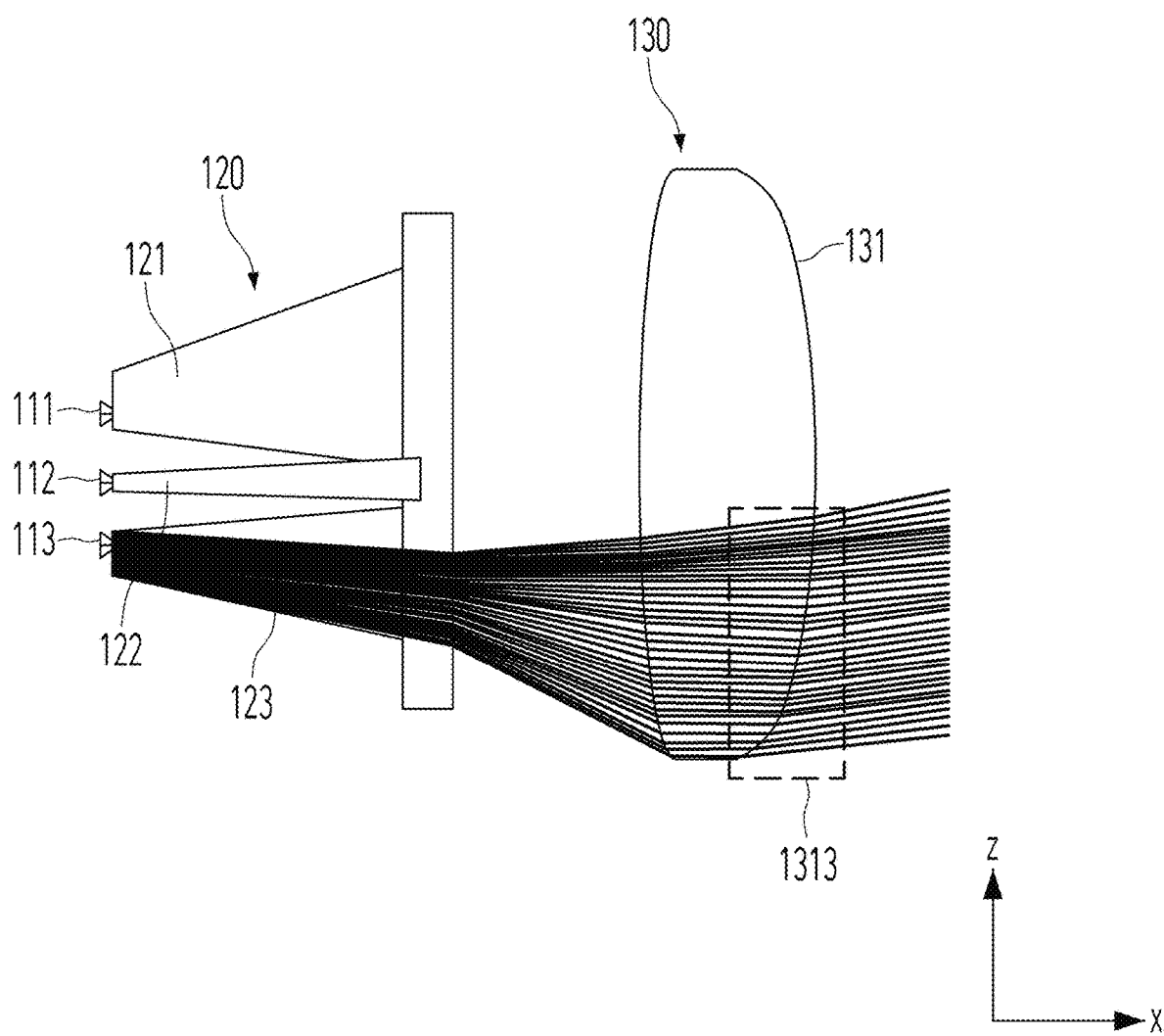

In the optical device 100 according to an embodiment of the disclosure, the exit surface 131 of the condenser lens 130 may include the first region 1311 that refracts light irradiated through the first light-incident portion 121 and a second region 1312 that refracts light irradiated through the second light-incident portion 122. The exit surface 131 of the condenser lens 130 may further include a third region 1313 that refracts light irradiated through the third light-input portion 123. These regions are illustrated in FIGS. 4 to 6.

Figure 7:
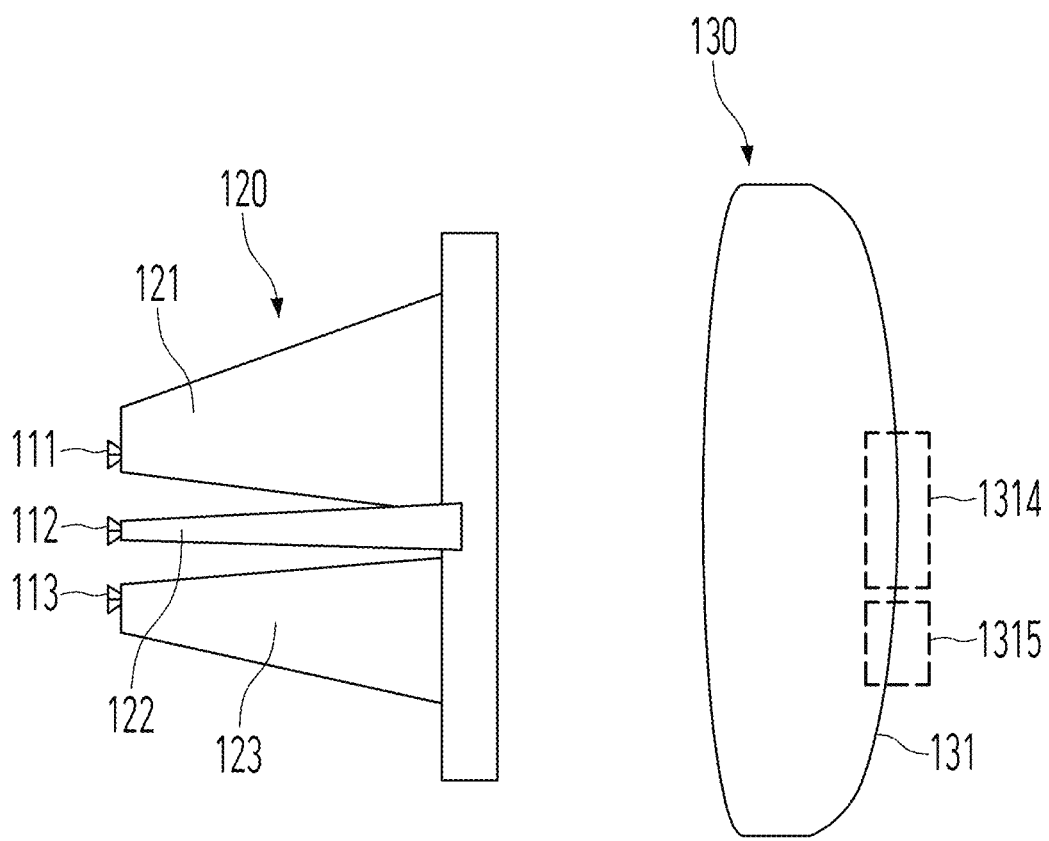

As illustrated in FIG. 7, the exit surface 131 of the condenser lens 130 in the optical device 100 according to an embodiment of the disclosure may include a first overlapping region 1314 in which the first region 1311 and the second region 1312 overlap each other. Further, the exit surface 131 of the condenser lens 130 may include a second overlapping region 1315 in which the second region 1312 and the third region 1313 overlap each other.

Particularly, referring to FIG. 8 together, the exit surface 131 of the condenser lens 130 in the optical device 100 according to an embodiment of the disclosure may include the first pattern portion 132 formed in the overlapping regions 1314 and 1315. Accordingly, diverse beam patterns may be formed through the exit lens 140.

That is, the optical device 100 according to an embodiment of the disclosure may implement beam pattern diversification by forming a new light path by refracting light from the first pattern portion 132 formed on the exit surface 131 of the condenser lens 130.

However, unintended refraction of light may occur in the overlapping regions 1314 and 1315 due to light irradiated through the different light-incident portions 121, 122, and 123 of the light guide member 120.

Accordingly, in the optical device 100 according to an embodiment of the disclosure, the first pattern portion 132 may include the pattern surface 1321 that forms a predetermined angle with the exit surface 131. It is possible to prevent the occurrence of unintended light refraction from the pattern surface 1321. For convenience of description, this will be described in the context of the first overlapping region 1314.

Referring to FIGS. 8 to 10 together, in the optical device 100 according to an embodiment of the disclosure, the first pattern portion 132 may include the pattern surface 1321 that forms the predetermined angle with the exit surface 131. The pattern surface 1321 may transmit one of light 1211 irradiated through the first light-incident portion 121 and the light 1221 irradiated through the second light-incident portion 122, and totally reflect the other.

For example, the pattern surface 1321 may allow the light 1211 irradiated through the first light-incident portion 121 to be transmitted and directed to the exit lens 140, and allow the light 1221 irradiated through the second light-input portion 122 to be totally reflected and not directed to the exit lens 140. This may prevent the occurrence of unintended light refraction as described above.

As illustrated in FIG. 9, this may be implemented by forming the pattern surface 1321 to be at the predetermined angle with the exit surface 131 in consideration of an angle θ1 between the pattern surface 1321 and the light 1211 irradiated through the first light-incident portion 121 and incident on the condenser lens 130 and an angle θ2 between the pattern surface 1321 and the light 1221 irradiated through the second light-incident portion 122 and incident on the condenser lens 130. The angle at which the light is totally reflected may be calculated by considering the material, material properties, and so on of the condenser lens 130.

In this case, the angle θ1 between the pattern surface 1321 and the light 1211 irradiated through the first light-incident portion 121 and incident on the condenser lens 130 may be made smaller than the calculated total reflection angle. This may allow the light 1211 irradiated through the first light-incident portion 121 to pass through the pattern surface 1321.

Likewise, the angle θ2 between the pattern surface 1321 and the light 1221 irradiated through the second light-incident portion 122 and incident on the condenser lens 130 may be made to be larger than the calculated total reflection angle. Accordingly, the light 1221 irradiated through the second light-incident portion 122 may be totally reflected from the pattern surface 1321.

Referring to FIG. 1 together, in the optical device 100 according to an embodiment of the disclosure, the first pattern portion 132 may include an array shape continuously formed in the horizontal direction (y-axis direction). This may enable diversification of beam patterns by forming a new light path.

Further, unlike the above description, the first pattern portion 132 may allow the light 1221 irradiated through the second light-incident portion 122 to be transmitted through the pattern surface 1321 in the optical device 100 of the disclosure, as illustrated in FIG. 11. This may be implemented by making the angle θ2 between the pattern surface 1321 and the light 1221 irradiated through the second light-incident portion 122 and incident on the condenser lens 130 smaller than the calculated total reflection angle.

Accordingly, a different light path from the above-described one may be formed, and beam patterns may be diversified.

In addition, referring to FIG. 12 together, the optical device 100 according to an embodiment of the disclosure may include the second pattern portion 133 formed in the first region 1311 or the second region 1312. Further, the second pattern portion 133 may be formed in the third region 1313 described above.

Therefore, unlike the first pattern portion 132, the second pattern portion 133 in the optical device 100 according to an embodiment of the disclosure may diversify beam patterns formed through the exit lens 140 by using light irradiated through each of the light-incident portions 121, 122, and 123.

That is, the optical device 100 according to an embodiment of the disclosure may implement diversification of beam patterns by forming a new light path by refracting light from the second pattern portion 133 formed on the exit surface 131 of the condenser lens 130.

To refract light in various ways, the second pattern portion 133 may be formed in a relief shape to protrude from the exit surface 131, or in a negative shape to be recessed from the exit surface 131.

In addition, the second pattern portion 133 in the optical device 100 according to an embodiment of the disclosure may include an array shape that is continuously formed in the horizontal direction (y-axis direction), as illustrated in FIG. 12. Further, the second pattern portion 133 may be formed in a plurality of rows. This may form various light paths and thus diversify beam patterns.

In summary, the optical device and the vehicle including the same according to the disclosure may increase the number of paths of light passing through the exit lens 140 that forms a beam pattern by refracting light from the exit surface of the condenser lens. Further, light may be focused by different curvatures of the center and the edge of the exit surface of the condenser lens. Further, various beam patterns may be formed by forming the pattern portions that refract light on the exit surface of the condenser lens. Further, improved forward visibility may be provided.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical device, comprising:
   a light source array configured to output light;
   a light guide member configured to allow the light output from the light source array to be irradiated forward;
   a condenser lens positioned in front of the light guide member and configured to refract the light irradiated through the light guide member; and
   an exit lens positioned in front of the condenser lens and configured to form a beam pattern using the light refracted from the condenser lens,
   wherein the condenser lens includes an exit surface having a first curvature at a center and a second curvature at an edge, and
   wherein the first curvature is different from the second curvature.

2. The optical device of claim 1, wherein the second curvature is smaller than the first curvature.

3. The optical device of claim 2, wherein the exit surface of the condenser lens refracts the light irradiated through the light guide member from the edge at a first angle larger than a second angle of the light irradiated through the light guide member from the center.

4. The optical device of claim 3, wherein the exit surface of the condenser lens has a convex shape.

5. The optical device of claim 1, wherein the light source array comprises:
   a first light source array arranged in a horizontal direction; and
   a second light source array arranged vertically spaced apart from the first light source array, and
   wherein the light guide member comprises:
   a first light-incident portion corresponding to the first light source array; and
   a second light-incident portion corresponding to the second light source array.

6. The optical device of claim 5, wherein the exit surface of the condenser lens comprises:
   a first region configured to refract light irradiated through the first light-incident portion;
   a second region configured to refract light irradiated through the second light-incident portion; and
   an overlapping region in which the first region and the second region overlap each other.

7. The optical device of claim 6, wherein the exit surface of the condenser lens comprises a first pattern portion formed in the overlapping region.

8. The optical device of claim 7, wherein the first pattern portion comprises a pattern surface that forms a predetermined angle with the exit surface.

9. The optical device of claim 8, wherein the pattern surface is configured to transmit one of the light irradiated through the first light-incident portion and the light irradiated through the second light-incident portion, and
   wherein the pattern surface is further configured to totally reflect the other one of the light irradiated through the first light-incident portion and the light irradiated through the second light-incident portion.

10. The optical device of claim 9, wherein the first pattern portion comprises an array shape continuously formed in the horizontal direction.

11. The optical device of claim 6, wherein the exit surface of the condenser lens comprises a second pattern portion formed in one of the first region or the second region.

12. The optical device of claim 11, wherein the second pattern portion is formed in one of a relief shape to protrude from the exit surface or in a negative shape to be recessed from the exit surface.

13. The optical device of claim 1, wherein a first length of the condenser lens in a horizontal direction or a vertical direction is larger than a second length of the light guide member in the horizontal direction or the vertical direction.

14. The optical device of claim 13, wherein a third length of the exit lens in the horizontal direction or the vertical direction is larger than the first length of the condenser lens in the horizontal direction or the vertical direction.

15. A vehicle, comprising:
   a vehicle body;
   a lamp structure positioned on a front surface of the vehicle body; and
   an optical device embedded in the lamp structure,
   wherein the optical device includes:
      a light source array configured to output light;
      a light guide member configured to allow the light output from the light source array to be irradiated forward;
      a condenser lens positioned in front of the light guide member and configured to refract the light irradiated through the light guide member; and
      an exit lens positioned in front of the condenser lens and configured to form a beam pattern using the light refracted from the condenser lens, and
   wherein the condenser lens comprises an exit surface including a first curvature at a center and a second curvature at an edge, and
   wherein the first curvature is different from the second curvature.

* * * * *